United States Patent [19]

Brown et al.

[11] E Re. 29,760

[45] Reissued Sep. 12, 1978

[54] POLYFUNCTIONAL ALKOXY ENDBLOCKED POLYSILOXANES AND THEIR CURED COMPOSITIONS

[75] Inventors: Paul L. Brown, Saginaw; James Franklin Hyde, Midland, both of Mich.

[73] Assignee: Dow Corning Corporation, Midland, Mich.

[21] Appl. No.: 832,842

[22] Filed: Sep. 13, 1977

Related U.S. Patent Documents

Reissue of:

[64] Patent No.: 3,161,614
Issued: Dec. 15, 1964
Appl. No.: 145,455
Filed: Oct. 16, 1961

[51] Int. Cl.[2] ..... C08G 77/04

[52] U.S. Cl. ..... 528/41; 260/37 SB; 260/448.8 R; 260/185; 528/42

[58] Field of Search ..... 260/46.5 R, 448.8 R, 260/46.5 G, 46.5 Y, 46.5 E, 46.5 P, 37 SB, 18 S

[56] References Cited

U.S. PATENT DOCUMENTS

| | | | |
|---|---|---|---|
| 2,672,455 | 3/1954 | Currie | 260/46.5 |
| 2,676,102 | 4/1956 | Boyd | 260/2 |
| 2,716,128 | 8/1955 | West | 260/46.5 |
| 2,721,855 | 10/1955 | Kin | 260/46.5 |
| 2,736,721 | 2/1956 | Dexter | 260/46.5 |
| 2,815,300 | 12/1957 | Smith | 260/46.5 |
| 2,909,549 | 10/1959 | Bailey | 260/448.2 |
| 3,035,016 | 5/1962 | Bruner | 260/46.5 |
| 3,065,194 | 11/1962 | Nitzsche et al. | 260/46.5 |
| 3,070,566 | 12/1962 | Nitzsche et al. | 260/46.5 |
| 3,109,826 | 11/1963 | Smith | 260/46.5 |
| 3,127,363 | 3/1964 | Nitzsche et al. | 260/46.5 |

OTHER PUBLICATIONS

Paint and Oil Chemical Review, Mar. 22, 1956, pp. 10–12.

*Primary Examiner*—Melvyn I. Marquis
*Attorney, Agent, or Firm*—Roger H. Borrousch

[57] ABSTRACT

*A siloxane of the formula*

$$(RO)_nSi\overset{R'_{3-n}}{|}\left[\overset{R''_y}{|}SiO_{\frac{4-y}{2}}\right]_x\left[\overset{R'_{3-n}}{|}Si(OR)_n\right]_z$$

*which can be cured by mixing with a catalyst and used as a siloxane rubber for a coating, a sealant or caulk.*

2 Claims, No Drawings

POLYFUNCTIONAL ALKOXY ENDBLOCKED POLYSILOXANES AND THEIR CURED COMPOSITIONS

Matter enclosed in heavy brackets [ ] appears in the original patent but forms no part of this reissue specification; matter printed in italics indicates the additions made by reissue.

This invention relates to polysiloxanes in which the terminal silicon atoms each have at least two alkoxy groups attached thereto.

Organopolysiloxanes in which the terminal silicon atoms have one alkoxy group attached thereto are known in the art. However, when these materials are hydrolyzed and the hydrolyzate condensed, the resulting product is a linear polysiloxane. Therefore, these siloxanes are not curable to form thermoset resins or rubbers.

It is the primary object of this invention to provide polyfunctional organosilicon compounds of known structure which are capable of being cured at room temperature to produce siloxane rubbery materials. It has been known for some time that one could mix hydroxylated polysiloxanes with alkoxysilanes in the presence of certain catalysts to produce a composition which will cure at room temperature. However, all heretofore known compositions of this type belong to the so-called "two component" room temperature curing siloxane rubbers. In other words, with the previously prepared siloxane compositions the mixing of the siloxane, the alkoxysilane and a catalyst cause spontaneous curing. Although these materials are highly useful in many applications, there are other applications in which it is highly desirable not to have to premix several ingredients on the job site. Also with the heretofore known room temperature curing compositions once the catalyst, polysiloxane and alkoxysilane were mixed, the composition had to be used within a few hours or else it would gel and become useless. For many commercial applications, this restriction was no hindrance to the use of the materials. However, it left the user open to serious loss of material if anything happened between the time of mixing and the time of use so that he was unable to employ the material in which case the unused portion of the batch would gel and become useless.

Consequently, it is a primary object of this invention to provide a novel composition of matter which is capable of being mixed with a catalyst in the absence of moisture and which will under these conditions remain stable indefinitely but which will cure spontaneously upon exposure to moisture. Another object is to produce compositions of matter which are useful as coating compositions, sealants, calking materials, electrical insulation, and for other uses for which siloxane rubbers are normally employed.

The term "moisture" as used herein includes both water and water vapor including atmospheric water vapor.

This invention relates to siloxanes in which the molecules are essentially of the formula $$(RO)_nSi(R'_{3-n})O\left[SiO_{\frac{4-y}{2}}(R''_y)\right]_x\left[Si(OR)_n(R'_{3-n})\right]_z$$

in which R is an aliphatic hydrocarbon radical or halogenated aliphatic hydrocarbon radical of from 1 to 8 inclusive carbon atoms, R′ and R″ are each selected from the group consisting of monovalent hydrocarbon radicals, monovalent halohydrocarbon radicals and monovalent cyanoalkyl radicals, all of from 1 to 18 inclusive carbon atoms, n has an average value from 2 to 3 inclusive, y has an average value from 1.99 to 2 inclusive, z has an average value from 1 to 1.01 and the sum of y and z is 3 and x has a value of at least 7.

It can be seen from the formula that the compositions can be both linear and branched in structure. However, the molecules are characterized by having two or three alkoxy groups attached to the terminal silicon atoms.

The term "molecules essentially of the formula" means that the siloxanes in general have the configuration shown above, but that the compositions within the scope of this invention can also contain some alkoxy and/or haloalkoxy groups dispersed along the molecular chain due to incidental hydrolysis and condensation of the terminal alkoxies. Thus, for example, some of the molecular species can have the configuration $$(RO)_nSi(R'_{3-n})O\left[SiO(R''_2)\right]_x Si(R')(OR)O\left[SiO(R''_2)\right]_x Si(OR)_n(R'_{3-n})$$

Such configurations are considered to be within the scope of the claims.

The compositions of this invention can be prepared by several methods. The best method is to react an hydroxylated siloxane of the formula $$(HO)_z\left(SiO_{\frac{4-y}{2}}(R''_y)\right)_x H$$

with a chlorosilane of the formula $R'_{3-n}(RO)_nSiCl$ in the presence of a hydrogen halide acceptor such as pyridine, alpha-picoline or other tertiary amines. Under these conditions reaction occurs at room temperature between the chlorine on the silane and the hydroxyl groups on the siloxane to produce HCl and to cause linking of the silane with the siloxane through an SiOSi linkage.

The above hydroxylated siloxanes can be prepared by any of the methods commonly employed to prepare such materials such as that shown in U.S. Pat. No. 2,779,776.

A second method of preparing the compositions of this invention is to react a halogen endblocked siloxane of the formula $$X_nSiO(R'_{3-n})\left(SiO_{\frac{4-y}{2}}(R''_y)\right)_x\left[SiX_n(R'_{3-n})\right]_z$$

with an alcohol of the formula ROH in the presence of a hydrogen halide acceptor such as those described above. This reaction proceeds at room temperature and the number of OR groups on the silicon will correspond to the number of chlorine atoms in the original siloxane.

Another method of preparing those compositions where R is haloalkyl is that of reacting the above halogen endblocked siloxanes with alkylene oxides such as ethylene oxide, 1,2-propylene oxide and 1,2-butylene oxide. This reaction goes at room temperature according to the schematic equation $$\equiv SiX_n + \overset{O}{\diagup\diagdown}CH_2CHB \longrightarrow Si(OCH_2\overset{X}{C}HB)_n$$

B can be either H or an alkoxy radical.

[Another method of preparing the compositions of this invention comprises reacting in the absence of moisture the above hydroxylated siloxanes with silanes of the formula $R'_{4-a}Si(OR)_a$ when a is 3 or 4 in the presence of a catalyst for the reaction of a SiOH with a silicon-bonded OR group. Suitable catalysts include amines and carboxylic acid salts of metals such as lead, tin and iron. This reaction can be represented as follows:]

$$\left[(HO)_z\left(SiO_{\frac{4-y}{2}}(R''_y)\right)_x H + R'_{4-a}Si(OR)_a \xrightarrow{cat} (RO)_nSiO(R_{3-n})\left[SiO(R''_2)\right]_x\left[Si(OR)_n(R'_{3-n})\right]_z + ROH\right]$$

[In carrying out this reaction more than one mol of the silane should be used per mol of SiOH in the siloxane. This will minimize the reaction of one silane molecule with two hydroxyl groups. The reaction proceeds at room temperature but higher temperatures may be employed if desired. If desired the by-produced alcohol can be removed from the product but this is not essential.]

If desired, the compositions of this invention can be mixed with fillers such as those commonly employed in organosilicon rubbers and with a curing catalyst and thereafter expose to moisture and allowed to cure. The fillers which can be employed herein are organic fillers such as phthalocyanine and copper phthalocyanine and inorganic fillers such as carbon black, glass, aluminum silicate, silicas such as diatomaceous earth, ground quartz, fume silica, silica xerogel and precipitated silicas and metal oxides such as alumina, titania, zirconia, zinc oxide, ferric oxide and magnesium oxide. The amount of filler is not critical and depends entirely upon the particular use to which the composition is to be put.

[The compositions of this invention are stable in the absence of moisture whether catalyzed or not.] The catalyst employed to cure the compositions of this invention can be any catalyst capable of causing the reaction of an alkoxysiloxane with water and of causing reaction between an SiOH group and a silicon-bonded alkoxy group. If desired, mutual solvents may be used to increase the solubility of the catalyst in the siloxane. One class of catalyst includes metal salts of monocarboxylic acids such as lead 2-ethyl octoate, dibutyl tin diacetate, dibutyl tin di-2-ethyl hexoate, dibutyl tin dilaurate, butyl tin tri-2-ethyl hexoate, iron 2-ethyl hexoate, cobalt 2-ethyl hexoate, manganese 2-ethyl hexoate, zinc 2-ethyl hexoate, stannous octoate, tin naphthenate, zirconium octoate, antimony octoate, bismuth naphthenate, tin oleate, tin butyrate, zinc naphthenate, zinc stearate and titanium naphthenate. The stannous carboxylates and certain orthotitanates and partial condensates thereof are preferred.

Another class of catalyst are titanium esters such as tetrabutyltitanate, tetra-2-ethylhexyltitanate, tetraphenyltitanate, tetraoctadecyltitanate, triethanolaminetitanate, octyleneglycotitanate and bisacetylacetonyldiisopropyltitanate.

Additional suitable catalysts include amines such as hexylamine, dodecylamine, and amine salts such as hexylamineacetate, dodecylaminephosphate and quaternary amino salts such as benzyltrimethylammoniumacetate and salts of alkali metals such as potassium acetate.

For the purpose of this invention the amount of catalyst is not critical but is normally present in amount of from .1 to 2 percent based on the weight of the siloxane.

The siloxanes employed in this invention can range from low viscosity fluids in which x has a value of 7 up to nonflowing gums in which x has a value of 5,000 or more. When maximum stress strain properties are desired, x should have a value of 100 or more. However, when fluid coating compositions are desired, it is often desirable that x have a value from 7 to 100. If x is below 7, the condensates form a high amount of cyclic material and is hence undesirable for curing compositions.

For the purpose of this invention, R can be any aliphatic radical of from 1 to 8, preferably 1 to 3 inclusive carbon atoms such as methyl, ethyl, propyl, isopropyl, allyl, butyl, 2-ethylbutyl and octyl. R can also be any haloaliphatic radical of 1 to 8 carbon atoms in which there is no halogen alpha to the silicon-bonded oxygen. Specific examples of such radicals are β-chloroethyl, β-bromopropyl 2,2,2-trifluoroethyl, 3,3,3,2,2-pentafluoropropyl, $-(CH_2)_4C_2F_5$, gamma-iodopropyl, β-chlorooctyl, β-chloroisopropyl, omega-chlorooctyl and 3-chloro-2-ethylhexyl.

R′ and R″ can be any monovalent hydrocarbon radical such as alkyl radicals such as methyl, ethyl, isopropyl, hexyl or octadecyl; any alkenyl radical such as vinyl, hexenyl; any cycloaliphatic radical such as cyclohexyl, cyclopentyl, cyclohexenyl; and alkaryl radical such as benzyl, β-phenylethyl, β-phenylpropyl and any aromatic hydrocarbon radical such as phenyl, xenyl, tolyl, naphthyl, or xylyl.

Both R′ and R″ can also be any halogenated monovalent hydrocarbon radical such as gamma-chloropropyl, perfluorovinyl, 3,3,3-trifluoropropyl, chlorophenyl, tetrabromophenyl, chloroxenyl, chlorocyclohexyl and α,α,α-trifluorotolyl. In addition R′ and R″ can both be any cyanoalkyl radical such as β-cyanoethyl, gamma-cyanopropyl, omega-cyanobutyl, β-cyanobutyl and omega-cyanooctadecyl.

It should be understood that the various R′ and R″ groups in any one molecule can be the same or they can be different. Thus, the compositions can be homopolymers or copolymers. Furthermore, the compositions can be mixtures of different homopolymers and copolymers or mixtures of copolymers and homopolymers. Also in any composition the R groups can be the same or different.

The following examples are illustrative only and should not be construed as limiting the invention which is properly delineated in the appended claims.

EXAMPLE 1

A mixture of 200 g. of an hydroxyl end blocked dimethylpolysiloxane having a viscosity of 2,000 cs., 200 ml. of toluene and 10 g. of pyridine was added to a solution of 3.1 g. of silicon tetrachloride in 100 ml. of toluene. Reaction occurred to give a siloxane having the average formula $$Cl_2SiO\left[\begin{array}{c}Me_3\\|\\SiO\end{array}\right]_{297}SiCl_3$$

After mixing for approximately 30 minutes, 6 g. of methanol was added and the reaction mixture agitated for another 30 minutes.

The pyridine hydrochloride was filtered and the solvent was removed under reduced pressure to a pot temperature of about 125° C. The stripped product corresponded to the average formula $$(MeO)_3SiO\left(\begin{array}{c}Me_2\\|\\SiO\end{array}\right)_{297}Si(OMe)_3$$

This material was stable in the absence of moisture even when catalyzed with di-n-hexylamine. However, when a mixture of the material and di-n-hexylamine were exposed to atmospheric moisture, it cured to a rubbery material.

EXAMPLE 2

1 g. of methyltrichlorosilane was added rapidly to a mixture of 100 g. of an hydroxyl endblocked dimethylpolysiloxane having a viscosity of 13,000 cs., 200 ml. of xylene and 10 ml. of pyridine. After mixing for 30 minutes, 10 ml. of methanol was added followed by agitation for an additional 30 minutes. The pyridine hydrochloride was filtered and the solvent removed by heating up to 120° C. at 1 mm. pressure. There was no change in the viscosity of the material. This material had the average molecular formula $$\begin{array}{c}Me\\|\\(MeO)_2SiO\end{array}\left[\begin{array}{c}Me_2\\|\\SiO\end{array}\right]_{541}\begin{array}{c}Me\\|\\Si(OMe)_2\end{array}$$

The product was mixed with di-n-hexylamine and was stable in the absence of moisture but cured to a rubbery material upon exposure to atmospheric moisture.

EXAMPLE 3

10 g. of triethoxychlorosilane was added to a mixture of 500 g. of an hydroxyl endblocked dimethylpolysiloxane of 13,000 cs. viscosity, 1,000 ml. of toluene and 10 ml. of pyridine. After mixing for 30 minutes, 5 ml. of ethanol was added to react with any remaining chlorine-bonded silicon. After allowing another 30 minutes for the reaction to be complete, the solids were removed and the solvent was stripped off to give a product having a viscosity of 12,150 cs. and having the average molecular formula $$(EtO)_3SiO\left[\begin{array}{c}Me_3\\|\\SiO\end{array}\right]_{541}Si(OEt)_3$$

This material was stable in the absence of moisture but gelled when mixed with di-n-hexylamine and thereafter exposed to the atmosphere.

EXAMPLE 4

The following siloxanes are obtained when the following hydroxylated siloxanes are reacted with the following alkoxychlorosilanes in accordance with the procedure of Example 3.

Table I

| Hydroxylated Siloxane | Chloroalkoxysilane | Product |
|---|---|---|
| $HO\left[\begin{array}{c}Me\\\vert\\SiO\\\vert\\C_2H_3\end{array}\right]_{100}H$ | $C_2H_3(MeO)_2SiCl$ | $\begin{array}{c}C_2H_3\\\vert\\(MeO)_2SiO\end{array}\left[\begin{array}{c}Me\\\vert\\SiO\\\vert\\C_2H_3\end{array}\right]_{100}\begin{array}{c}C_2H_3\\\vert\\Si(OMe)_2\end{array}$ |
| $HO\left[\left(\begin{array}{c}Pb_2\\\vert\\SiO\end{array}\right)_2\left(\begin{array}{c}Me_2\\\vert\\SiO\end{array}\right)_{98}\right]H$ | $Cl_2C_6H_3(MeO)_2SiCl$ | $\begin{array}{c}C_6H_3Cl_2\\\vert\\(MeO)_2SiO\end{array}\left[\left(\begin{array}{c}Ph_2\\\vert\\SiO\end{array}\right)_2\left(\begin{array}{c}Me_2\\\vert\\SiO\end{array}\right)_{98}\right]\begin{array}{c}C_6H_3Cl_2\\\vert\\Si(OMe)_2\end{array}$ |
| $HO\left(\begin{array}{c}Me\\\vert\\SiO\\\vert\\C_{18}H_{37}\end{array}\right)_{20}H$ | $(CH_3)_2CHCH_2Si(OMe)_2Cl$ | $\begin{array}{c}(OMe)_2\\\vert\\(CH_3)_2CHCH_2SiO\end{array}\left[\begin{array}{c}Me\\\vert\\SiO\\\vert\\C_{18}H_{37}\end{array}\right]_{20}\begin{array}{c}(OMe)_2\\\vert\\SiCH_2CH(CH_3)_2\end{array}$ |
| $HO\left[\begin{array}{c}Me_2\\\vert\\SiO\end{array}\right]_{5,000}H$ | $\begin{array}{c}Cl\\\vert\\CF_3CH_2CH_2Si(OMe)_2\end{array}$ | $\begin{array}{c}CH_2CH_2CF_3\\\vert\\(MeO)_2SiO\end{array}\left[\begin{array}{c}Me_2\\\vert\\SiO\end{array}\right]_{5,000}\begin{array}{c}CH_2CH_2CF_3\\\vert\\Si(OMe)_2\end{array}$ |
| $HO\left[\begin{array}{c}CH_2CH_2CF_3\\\vert\\SiO\\\vert\\Me\end{array}\right]_{20}H$ | $MeSi(OMe)_2Cl$ | $\begin{array}{c}Me\\\vert\\(MeO)_2SiO\end{array}\left[\begin{array}{c}CH_2CH_2CF_3\\\vert\\SiO\\\vert\\Me\end{array}\right]_{20}\begin{array}{c}Me\\\vert\\Si(OMe)_2\end{array}$ |

Table I-continued

| Hydroxylated Siloxane | Chloroalkoxysilane | Product |
|---|---|---|
| $HO\left(\begin{matrix}CH_2CH_2CN\\ \mid\\ SiO\\ \mid\\ Me\end{matrix}\right)_{100}H$ | $PhSi(OMe)_2Cl$ | $(MeO)_2\overset{Ph}{\overset{\mid}{Si}}O\left[\begin{matrix}CH_2CH_2CN\\ \mid\\ SiO\\ \mid\\ Me\end{matrix}\right]_{100}\overset{Ph}{\overset{\mid}{Si}}(OMe)_2$ |
| $HO\left(\begin{matrix}Ph\\ \mid\\ SiO\\ \mid\\ Me\end{matrix}\right)_{20}H$ | $(C_3H_7O)_3SiCl$ | $(C_3H_7O)_3SiO\left[\begin{matrix}Ph\\ \mid\\ SiO\\ \mid\\ Me\end{matrix}\right]_{20}Si(OC_3H_7)_3$ |
| $H\left[\left(\begin{matrix}Me_2\\ \mid\\ OSi\end{matrix}\right)_{40}\begin{matrix}OH\\ \mid\\ OSi\\ \mid\\ Me\end{matrix}\left(\begin{matrix}Me_2\\ \mid\\ OSi\end{matrix}\right)_{80}\right]OH$ | $C_6H_{11}Si(OMe)_2Cl$ | $(MeO)_2\overset{C_6H_{11}}{\overset{\mid}{Si}}O\left[\left(\begin{matrix}Me_2\\ \mid\\ SiO\end{matrix}\right)_{40}\begin{matrix}C_6H_{11}\\ \mid\\ OSi(OMe)_2\\ \mid\\ Si\\ \mid\\ Me\end{matrix}-O-\left(\begin{matrix}Me_2\\ \mid\\ SiO\end{matrix}\right)_{80}\right]\overset{C_6H_{11}}{\overset{\mid}{Si}}(OMe)_2$ |
| $HO\left[\begin{matrix}Me_2\\ \mid\\ SiO\end{matrix}\right]_{100}H$ | $\left(\begin{matrix}C_2H_3\\ \mid\\ CH_3CH_2CHCH_2O\end{matrix}\right)_3SiCl$ | $\left(\begin{matrix}C_2H_5\\ \mid\\ CH_3CH_2CHCH_2O\end{matrix}\right)_3SiO\left[\begin{matrix}Me_2\\ \mid\\ SiO\end{matrix}\right]_{100}Si\left(\begin{matrix}C_2H_5\\ \mid\\ OCH_2CHCH_2CH_3\end{matrix}\right)_3$ |
| $\begin{matrix}Me\\ \mid\\ Si\end{matrix}\left[\left(\begin{matrix}Cl\\ C_6H_9\end{matrix}\right)\begin{matrix}Me_2\\ \mid\\ OSi-O-Si\\ \mid\\ Me\end{matrix}\right]_{100}OH\Bigg]_3$ | $MeSi(OMe)_2Cl$ | $\begin{matrix}Me\\ \mid\\ Si\end{matrix}\left[\left(\begin{matrix}Cl\\ C_6H_9\end{matrix}\right)\begin{matrix}Me_2\\ \mid\\ OSi-O-Si\\ \mid\\ Me\end{matrix}\right]_{100}\begin{matrix}Me\\ \mid\\ OSi(OMe)_2\end{matrix}\Bigg]_3$ |
| $Si\left[\left(\begin{matrix}Me_2\\ \mid\\ OSi\end{matrix}\right)_{100}OH\right]_4$ | $MeSi(OMe)_2Cl$ | $Si\left[\left(\begin{matrix}Me_2\\ \mid\\ OSi\end{matrix}\right)_{100}\begin{matrix}Me\\ \mid\\ OSi(OMe)_2\end{matrix}\right]_4$ |

[Each of the above compounds is stable when mixed with .5 percent by weight dibutyl tin dilaurate and stored in the absence of moisture, but will cure at room temperature when the mixture is exposed to moisture.]

EXAMPLE 5

10 ml. of silicontetrachloride was added to an anhydrous mixture of 250 ml. of xylene, 100 ml. of toluene and 30 ml. of α-picoline. 250 g. of a 1,140 cs. hydroxyl endblocked dimethylpolysiloxane was then added with stirring. After 30 minutes the excess silicontetrachloride was distilled from the mixture. 30 ml. of gamma-chloropropanol was then added with stirring and after 30 minutes the precipitated picoline-hydrochloride was filtered. The solvent was then removed and the resulting siloxane had a viscosity of about 1200 cs. and had the average formula $$(ClCH_2CH_2CH_2O)_3SiO\left[\begin{matrix}Me_2\\ SiO\end{matrix}\right]_x Si(OCH_2CH_2CH_2Cl)_3$$

This material was mixed with n-hexylamine and the mixture was stable in the absence of moisture but cured on exposure to atmosphere to a rubbery gel.

EXAMPLE 6

The procedure of Example 5 was repeated except that 30 ml. of delta-chlorobutanol was employed. The resulting siloxane had a viscosity of about 2,000 cs. and an average formula $$[Cl(CH_2)_4O]_3SiO\left[\begin{matrix}Me_2\\ SiO\end{matrix}\right]_x Si[O(CH_2)_4Cl]_3$$

This material was mixed with n-hexylamine and it was stable in the absence of moisture but cured to a rubbery solid on exposure to the atmosphere.

EXAMPLE 7

10 ml. of silicontetrachloride was added to an anhydrous solution of 250 ml. of xylene, 100 ml. toluene and 30 ml. of α-picoline. 250 g. of 1140 cs. hydroxyl endblocked dimethylpolysiloxane was then added with stirring. The mixture was cooled to about 0° C. and 100 ml. of liquid ethylene oxide was added. The mixture was allowed to warm to room temperature and was stirred over-night. The solution was filtered and the solvent was removed. The product was redissolved in dry toluene and the solution was filtered and the toluene removed. The resulting siloxane had a viscosity of about 1140 cs. and had the formula $$(ClCH_2CH_2O)_3SiO\left[\begin{matrix}Me_2\\ SiO\end{matrix}\right]_x Si(OCH_2CH_2Cl)_3$$

This material was stable when mixed with hexylamine in the absence of moisture but the mixture cured in 2 minutes on exposure to moisture to give a rubbery material.

EXAMPLE 8

The procedure of Example 7 was repeated except that 100 ml. of 1,2-propanol oxide was employed. The resulting siloxane was a viscous fluid in which the structure was essentially that of a dimethylpolysiloxane having terminal groups in which the terminal silicon atoms had 3-gamma-chloropropoxy groups attached thereto.

EXAMPLE 9

300 g. of a 2000 cs. hydroxyl endblocked dimethylpolysiloxane was dissolved in 300 g. of toluene and 10 g. of pyridine. 4.5 g. of the methyltrichlorosilane was then added with stirring and after 30 minutes β-chloropropanol was added with stirring. After 30 minutes the pyridine hydrochloride was filtered and the solvents and volatile materials were removed by distillation. The resulting liquid product was a siloxane having the average formula $$(CH_3\overset{\overset{Cl}{|}}{C}HCH_2O)_2\overset{\overset{Me}{|}}{Si}O\left[\begin{array}{c}Me_2\\|\\Si\end{array}\right]_x\overset{\overset{Me}{|}}{Si}(OCH_2\overset{\overset{Cl}{|}}{C}HCH_3)_2$$

This material was stable in the absence of moisture when mixed with hexylamine but the mixture gelled to a rubbery material when exposed to atmospheric moisture.

EXAMPLE 10

300 g. of a 2000 cs. hydroxyl endblocked dimethylpolysiloxane was dissolved in 300 g. of toluene and 10 g. of pyridine. The mixture was stirred and 4.5 g. of methyltrichlorosilane was added. After 30 minutes, 9 g. of 3,3,3-trifluoroethanol was added. After 30 minutes stirring the pyridine-hydrochloride was filtered and the solvent and other volatiles removed by distllation. The resulting fluid siloxane had the average formula $$(CF_3CH_2O)_2\overset{\overset{Me}{|}}{Si}O\left[\begin{array}{c}Me_2\\|\\SiO\end{array}\right]_x\overset{\overset{Me}{|}}{Si}(OCH_2CF_3)_2$$

This material was stable when mixed with hexylamine in the absence of moisture but cured in a short while when exposed to moisture to a rubbery material.

EXAMPLE 11

5 g. of a 5000 cs. hydroxyl endblocked dimethylpolysiloxane was mixed with 3 g. of tetrakis-3,3,3-trifluoroethoxysilane and 1 g. of propanol. The latter was added to increase the compatibility of the system. .07 g. of di-n-hexylamine was then added, the mixture became clear showing reaction between the siloxane and silane to produce a fluid siloxane of the average formula $$(CF_3CH_2O)_3SiO\left[\begin{array}{c}Me_2\\SiO\end{array}\right]_{400}Si(OCH_2CF_3)_3$$

This material is stable in the absence of moisture but cures on exposure to the atmosphere.

That which is claimed is:

1. A composition of matter consisting essentially of a siloxane of the formula $$(RO)_n\overset{\overset{R'_{3-n}}{|}}{Si}O\left[\begin{array}{c}R''_y\\|\\SiO_{\frac{4-y}{2}}\end{array}\right]_x\left[\begin{array}{c}R'_{3-n}\\|\\Si(OR)_n\end{array}\right]_z$$

in which R is selected from the group consisting of monovalent haloaliphatic hydrocarbon radicals having no halogen on the carbon alpha to the oxygen and monovalent aliphatic hydrocarbon radicals both of said radicals having from 1 to 8 inclusive carbon atoms, both R′ and R″ are each selected from the group consisting of monovalent hydrocarbon radicals, monovalent halohydrocarbon radicals and monovalent cyanoalkyl radicals all of from 1 to 18 carbon atoms, n has an average value from 2 to 3 inclusive, y has an average value from 1.99 to 2 inclusive, z has an average value from 1 to 1.01 inclusive and the sum of y+z is 3 and x has a value of at least 7.

2. A composition in accordance with claim 1 where R, R′ and R″ are all methyl radicals.

[3. A curable composition of matter which is stable in the absence of moisture but which will cure upon exposure to atmospheric moisture consisting essentially of (1) a siloxane in which the molecules are essentially of the formula $$(RO)_n\overset{\overset{R'_{3-n}}{|}}{Si}O\left[\begin{array}{c}R''_y\\|\\SiO_{\frac{4-y}{2}}\end{array}\right]_x\left[\begin{array}{c}R'_{3-n}\\|\\Si(OR)_n\end{array}\right]_z$$

in which R is selected from the group consisting of monovalent haloaliphatic hydrocarbon radicals having no halogen on the carbon alpha to the oxygen and monovalent aliphatic hydrocarbon radicals both of said radicals having from 1 to 8 inclusive carbon atoms, R′ and R″ each are selected from the group consisting of monovalent hydrocarbon radicals, monovalent halohydrocarbon radicals and monovalent cyanoalkyl radicals, all of from 1 to 18 inclusive carbon atoms, n has an average value from 2 to 3 inclusive, y has an average value from 1.99 to 2 inclusive, z has an average value from 1 to 1.01 inclusive and the sum of y+z is 3 and x has a value of at least 7 and (2) a curing catalyst for the siloxane.]

[4. A composition in accordance with claim 3 which also includes a filler.]

[5. A composition in accordance with claim 3 in which R, R′ and R″ are all methyl radicals.]

[6. The method of forming a cured material which comprises exposing the composition of claim 3 to moisture.]

* * * * *